Figure 1:
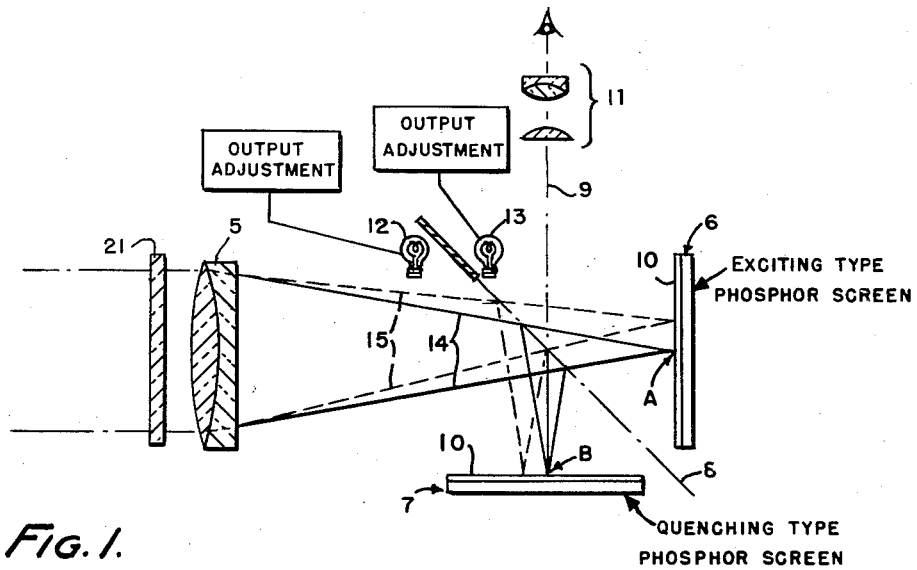

April 5, 1955      E. K. KAPRELIAN      2,705,758
MOVING TARGET INDICATOR

Filed Jan. 27, 1954

INVENTOR.
EDWARD K. KAPRELIAN
BY
*Harry M. Saragovitz*
ATTORNEY

# United States Patent Office 2,705,758
Patented Apr. 5, 1955

2,705,758

MOVING TARGET INDICATOR

Edward K. Kaprelian, Weatogue, Conn., assignor to the United States of America as represented by the Secretary of the Army Application January 27, 1954, Serial No. 406,619

4 Claims. (Cl. 250—71)

(Granted under Title 35, U. S. Code (1952), sec. 266)

The invention described herein may be manufactured and used by or for the Government for governmental purposes without the payment of any royalty thereon.

This invention relates to an apparatus for creating a signal of relatively great intensity which will focus immediate attention upon the movement of an object within a given area of surveillance.

An image of the area or object under observation is created by a lens. The image beam from the lens is divided into two components by a suitable beam splitting device. One of these components falls upon a screen having a layer of a phosphor chosen from the class which is excited by the light reaching it from the lens to produce luminous rays in proportion to the intensity of light throughout the image pattern. The other beam component is directed upon a screen having a layer of a different phosphor which has the property of quenching instead of exciting luminescence when light from the lens reaches it.

The luminescence upon the two phosphor layers, therefore, is opposite in intensity, one image being positive and the other negative. When these images are viewed thru the beam splitting device in such a manner that they appear superposed, a substantially even field of luminosity is created showing only a trace of the image or none at all. The phosphors used respond to changes in energy level at a relatively slow rate and are also chosen to have a relatively different rate of response.

During periods when no movement takes place within the observed scene a substantially even degree of brightness is seen upon the screens. When, however, an object in the scene starts to move the excitation characteristic of one of the screens and the quenching characteristic of the other screen at the point of movement function at different rates and the balance of brightness is upset. During the period of unbalance the energy level of the two phosphors is changing at different rates and a distinct difference in energy level is exhibited upon the screen at the point where the object moves. The object and its position upon the screen is therefore readily detected.

The detection phenomena may be viewed directly by an observer or the change in energy on the phosphor screens may be detected by a photo cell, the output of which may be employed to actuate a relay which in turn may control a substantial quantity of power to actuate a load device of any desired nature. The characteristics of the phosphors used on the respective screens may be chosen to fulfill a particular condition imposed by a desired objective.

A more detailed description of the apparatus will appear hereinafter in connection with the presentation of a specific embodiment of the invention.

It is a primary object of the invention to provide an apparatus which is highly sensitive in detecting a moving object or objects within an area under surveillance.

A further object of the invention is to provide a detecting apparatus which produces a signal representing a substantial change in energy distribution at the point of action.

A further object of the invention is to provide a moving object detecting device of simple design involving the use of a minimum of relatively low cost elements which function at high efficiency.

A still further object of the invention is to provide an apparatus useful not only to provide a visible signal of a moving object but which is adaptable to the direct operation of an audible signal or which may be adapted thru conventional relay devices to control relatively high power load devices such as controlling motors and the like.

Figure 2:
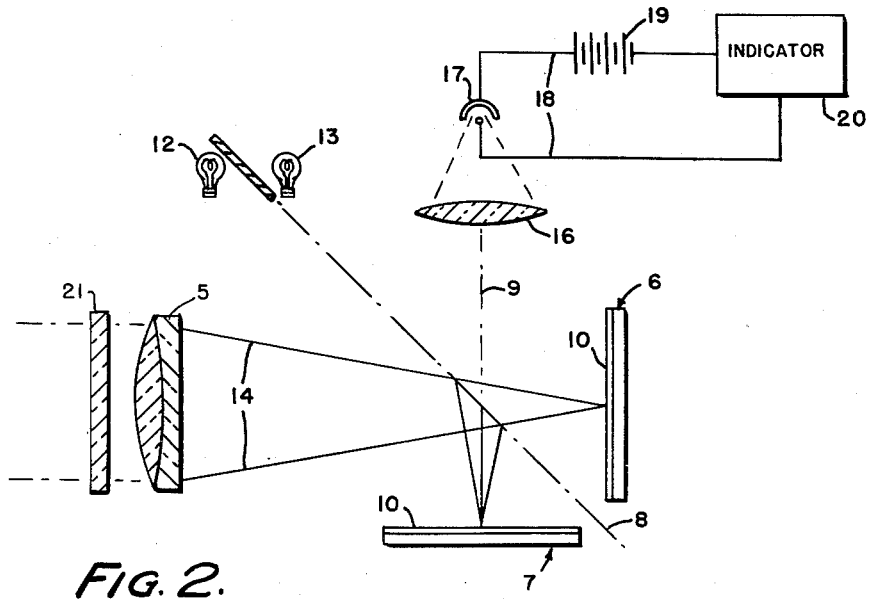

Other objects and features of the invention will more fully appear from the following description taken in connection with the accompanying drawings wherein Fig. 1 is a diagrammatic representation of a preferred embodiment of the invention and Fig. 2 is a partial diagrammatic view of a modified form of the invention.

Among the many uses for the invention is its application to situations wherein it becomes highly important to immediately detect the movement of an object included within a given area of observation. In such situations the invention provides a signal having sufficient energy to produce an unmistakable indication which cannot be overlooked by an observer. The high efficiency of the present invention stems in part from the fact that the object in motion appears upon a flatly and evenly illuminated field. The resulting high contrast provides a clear and distinct indication of the moving object which increases the accuracy and overall effectiveness of the apparatus.

A particularly valuable application of the principles of the invention lies in its military use wherein it may play an important part in military strategy by detecting movement of objects in a sector of enemy territory. In such an application not only is the movement of objects such as targets for artillery important to be noted but also the position of such targets with respect to the surrounding terrain is another vital factor which may be indicated. By providing an observing screen upon which gun pointing data is inscribed certain valuable information may be obtained for directing the firing of artillery.

The embodiment of the invention to be described is suitable for military application. In such a device a lens 5 is mounted in a supporting structure, not shown, which can be directed upon the scene to be monitored. The device has two screens 6 and 7 upon which are coated layers of phosphor having different characteristics, the function of which will be pointed out hereinafter. One of the screens, for instance, screen 6 is placed at the focal distance of the lens 5 so that the main image beam from the lens strikes its phosphor coating. A beam splitter 8 which may be of any suitable construction such as a partially silvered mirror is placed in such position that the main image beam is split desirably in the ratio of substantially 1:1 and the split-off portion of the main beam is directed upon the screen 7.

The screens 6 and 7 may be arranged in any convenient manner. As shown in the drawing the plane of the screen 6 is placed at right angles to the plane of the screen 7 and the beam splitter is so arranged that when the screen 7 is observed a superposed image of the screen 6 will be simultaneously seen by the observer. The two screens will appear in the desired relationship when the apparatus is viewed along the line 9 in Fig. 1. A suitable eye piece 11 may be provided for observing the screens.

The two screens have coatings of carefully selected phosphors 10 upon their respective surfaces. The phosphor upon one of the screens, for example, the screen 6 is selected from the exciting type which produces a positive image when properly stimulated. The phosphor on the screen 7 is chosen from the quenching type of phosphors and produce a negative image when acted upon by the split-off portion of the main image beam. The phosphors also have different rates at which they respond to a change in energy. Each screen is energized by a suitable light source. Desirably, separate ultra-violet lamps 12 and 13 are provided situated in position to respectively activate the screens 7 and 6. Each lamp may be provided with means for varying its ultra-violet output by means of which the relative brightness of the two screens may be adjusted to coact with the beam splitter to provide the desired appearance of an evenly distributed brightness throughout the screen area when no movement takes place in the scene. A bright portion of the image beam striking the quenching phosphor will produce a dark area while the corresponding portion of the image beam striking the exciting phosphor will produce a bright area.

The addition of these brightnesses yields a medium tone of evenly distributed brightness thruout the entire area of the screen. The desired effect is obtained by adjustment of the light sources 12 and 13.

The energized phosphor layers are particularly sensitive to infra-red light and it is within this portion of the spectrum that the apparatus described herein is to be operated. To provide the correct illumination an infra-red filter 21 is placed before the lens 5.

The lens 5 may be of relatively inexpensive construction. It may be designed to provide a curved field at large aperture. The curved field may in turn be corrected by using screens which are "dished" to the proper extent.

The even-toned appearance of the superposed images persists so long as all objects in the field of view remain motionless. When an object within the field of view of the lens 5 moves, the even balance of the energy distribution on the phosphor screens is upset. Referring to Fig. 1 the full lines 14 represent the cones of light coming from an object under observation, the rays from which are focused at point A on the screen 6 and at point B on the screen 7. The dotted lines 15 represent the position of the cones of light after the object has moved.

During the motion of the object the inherent characteristics of the phosphors function to produce different rates of change of energy upon the screen. Thus, at the point of movement the normal balance of the two screens is changed and the change in energy on the screens produces a bright area. With the types of phosphor chosen for illustration the bright area persists for a few seconds and then becomes dark. A reverse phenomena may also take place depending upon the phosphors chosen to meet the requirements of a given application.

Examples of suitable types of phosphors are as follows. For the screen 6 the exciting type of phosphor may be a Standard VII phosphor or a Fonda type phosphor, while the quenching phosphor on screen 7 may be copper cobalt activated zinc sulfide.

Observation of the screen and relaying of its indicated intelligence may be made by an operator maintaining constant watch at the eye piece of the device. However, the apparatus may be arranged to provide means other than direct observation to indicate the condition of motion of an object in the field of observation. For example, the desired intelligence may be conveyed to a remote point or to one not maintaining direct constant observation of the screen.

One such arrangement is shown in Fig. 2 of the drawing wherein the screens 6 and 7, the exciting lamps and the beam splitter are all arranged as in the apparatus shown in Fig. 1. In Fig. 2, however, in place of the eye piece 11 a lens 16 is provided to concentrate light from the screens upon a photo cell 17. The cell is connected in a circuit 18 including a battery 19 and an indicator 20. The indicator 20 may be of any type such as one which gives an audible signal. In place of the indicator a relay may be used to control higher energy loads such as control motors and the like or by means of appropriate apparatus gun pointing may be accomplished.

What is claimed is:

1. Apparatus for detecting moving objects comprising a lens for creating a primary image of an area to be observed, means to divide the image beam from the lens into two components, a pair of screens upon which said image components are respectively focused, a layer of a substance on one screen characterized in that light from the lens incident thereon creates a positive luminescent image at a given rate, a substance on said other screen characterized in that light from the lens creates a negative luminescent image thereon at a different rate than that of said other substance, said screens being arranged to permit the images thereon to be seen in registered overlying relation whereby when thus viewed the luminous pattern on said screens appears to be neutralized and when an object in the field of the lens moves its movement is indicated by a local change in energy on the screens.

2. An apparatus for detecting moving objects comprising a lens for creating a primary image of an area to be observed, a beam splitting device for dividing the primary image into two component images, radiation sensitive ultra violet activated phosphor screens placed at the focal distance of the respective beam components, one of said screens having a coating of an exciting type of phosphor and the other screen having a coating of a quenching type of phosphor, said screens being arranged to be viewed with their respective images superposed whereby when thus viewed the positive luminescence of one image component is canceled by the negative luminescence of the other image component when no change in the lens field takes place, said phosphor coatings acting to create an intense signal caused by a temporary local change in energy on the screens when an object in the field of the lens moves.

3. An apparatus for detecting moving objects comprising a lens for creating a primary image of an area to be observed, an infra-red filter in the image beam thereof, a beam splitting means acting to divide said primary image into two component images, a pair of ultra violet activated infra-red sensitive screens upon which the two image components are respectively focused, said beam splitter and screens being so disposed that the two image components may be viewed in registered superposed relation, one of said screens having a sensitive coating thereon characterized in that it creates a positive luminescent picture and said other screen having a sensitive coating thereon characterized in that its image component reacts therewith to quench the luminescence thereon to produce a negative luminescent picture, the response of the respective sensitive materials taking place at different rates whereby a moving object in the field of the lens creates a local change in energy on the screens to indicate the moving object.

4. An apparatus for detecting moving objects comprising a lens for creating a primary image of an area to be observed, a beam splitting device in the primary image, a pair of phosphor coated screens situated respectively in the focal plane of the respective image components, separate sources of ultra violet light having means to adjust the intensity of their output, said light sources being arranged to independently activate the respective screens, said beam splitter and screens being disposed to permit viewing of the screen images in registered superposed relation, the phosphor on one screen being of the its image component and the phosphor on the other screen exciting type and creating a positive luminous picture of its image component and the phosphor on the other screen being of the quenching type acting to produce a negative luminescent picture of its image component, each phosphor having a different rate of response to energization whereby movement of an object in the lens field is indicated by a substantial local change in energy on the screens.

References Cited in the file of this patent

UNITED STATES PATENTS

| | | |
|---|---|---|
| 2,074,226 | Kunz et al. | Mar. 16, 1937 |
| 2,549,860 | Swanson | Apr. 24, 1951 |